(12) United States Patent
Suh et al.

(10) Patent No.: US 8,866,886 B2
(45) Date of Patent: Oct. 21, 2014

(54) METHOD AND APPARATUS FOR PROCESSING AND RECEIVING DIGITAL BROADCAST SIGNAL FOR 3-DIMENSIONAL SUBTITLE

(75) Inventors: Jongyeul Suh, Seoul (KR); Hotaek Hong, Seoul (KR); Jeehyun Choe, Seoul (KR); Joonhui Lee, Seoul (KR); Seokjoo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 290 days.

(21) Appl. No.: 13/117,806

(22) Filed: May 27, 2011

(65) Prior Publication Data

US 2011/0292174 A1 Dec. 1, 2011

Related U.S. Application Data

(60) Provisional application No. 61/349,884, filed on May 30, 2010, provisional application No. 61/374,251, filed on Aug. 16, 2010, provisional application No. 61/413,900, filed on Nov. 15, 2010.

(51) Int. Cl.
*H04N 13/00* (2006.01)

(52) U.S. Cl.
CPC ......... *H04N 13/007* (2013.01); *H04N 13/0059* (2013.01); *H04N 13/0048* (2013.01); *H04N 13/0066* (2013.01)
USPC ................... 348/43; 348/46; 348/48; 348/51; 348/54; 348/465; 348/467; 348/468

(58) Field of Classification Search
USPC ............ 348/43, 46, 42, 51, 54, 48, 465, 467, 348/468; 345/419, 420, 421, 422, 619, 629, 345/632, 633, 634, 636
See application file for complete search history.

(56) References Cited

U.S. PATENT DOCUMENTS

| | | | |
|---|---|---|---|
| 8,013,873 B2 * | 9/2011 | Barenbrug et al. | 345/629 |
| 2007/0288844 A1 | 12/2007 | Zingher et al. | |
| 2009/0324202 A1 | 12/2009 | Okubo et al. | |
| 2010/0238267 A1 * | 9/2010 | Izzat et al. | 348/43 |

(Continued)

FOREIGN PATENT DOCUMENTS

| | | | |
|---|---|---|---|
| JP | 2004-274125 A | | 9/2004 |
| WO | WO 2008/115222 A1 | | 9/2008 |

(Continued)

OTHER PUBLICATIONS

"Digital Video Broadcasting (DVB); Subtitling systems". European Broadcasting Union: ETSI EN 300 743 V1.3.1, Nov. 2006, pp. 1-51.*

(Continued)

*Primary Examiner* — Christopher S Kelley
*Assistant Examiner* — Zhihan Zhou
(74) *Attorney, Agent, or Firm* — McKenna Long & Aldridge LLP

(57) ABSTRACT

The disclosed method for processing a digital broadcast signal including a 3-dimensional, 3D, content comprises encoding 3D video data for the 3D content, the 3D video data including a left picture for a left view and a right picture for a right view for a 3D image, generating signaling data including a subtitle segment having information for signaling 3D subtitles for the 3D content, and transmitting the digital broadcast signal including the encoded 3D video data and generated signaling data.

14 Claims, 10 Drawing Sheets

| Syntax | No. of bits | Mnemonics |
|---|---|---|
| extended_display_definition_segment ( ) { | | |
| sync_byte | 8 | bslbf |
| segment_type | 8 | bslbf |
| page_id | 16 | uimsbf |
| segment_length | 16 | uimsbf |
| edds_version_number | 4 | uimsbf |
| reserved | 4 | uimsbf |
| display_width | 16 | uimsbf |
| display_height | 16 | uimsbf |
| display_shift_type | 2 | uimsbf |
| reference_disparity | 14 | uimsbf |
| } | | |

(56) References Cited

U.S. PATENT DOCUMENTS

| | | | |
|---|---|---|---|
| 2010/0265315 A1* | 10/2010 | Okuda et al. | 348/43 |
| 2011/0037833 A1* | 2/2011 | Lee et al. | 348/46 |
| 2011/0069153 A1* | 3/2011 | Nakane | 348/43 |
| 2011/0128351 A1* | 6/2011 | Newton et al. | 348/43 |
| 2011/0221862 A1* | 9/2011 | Eyer | 348/43 |
| 2012/0098928 A1* | 4/2012 | Yun et al. | 348/43 |

FOREIGN PATENT DOCUMENTS

| | | | |
|---|---|---|---|
| WO | WO 2009/078678 A2 | | 6/2009 |
| WO | WO 2010/010499 A1 | | 1/2010 |
| WO | WO 2010013382 A1 | * | 2/2010 |
| WO | WO 2010/085074 A2 | | 7/2010 |
| WO | WO 2010/093115 A2 | | 8/2010 |

OTHER PUBLICATIONS

Senda. JP2004-274125 Translated Abstract. Sep. 2004.*

"Digital Video Broadcasting (DVB); Subtitling systems, European Broadcasting Union Union Européenne de Radio-Télévision EBUÜER; ETSI EN 300 743", ETSI Standards, LIS, Sophia Antipolis Cedex, France, vol. BC, No. V1.3.1, Nov. 1, 2006, XP014039581.

Anonymous: "White paper Blu-ray Disc Format: 2.B Audio Visual Application Format Specifications for BD-ROM Version 2.4", Apr. 30, 2010, XP055007518, Retrieved from the Internet: URL:http://www.blu-raydisc.com/assets/Downloadablefile/BD-ROM-AV-WhitePaper_100423-17830.pdf; [retrieved on Sep. 19, 2011] *p. 442, paragraph 6.3-p. 45, paragraph 6.4; figures 6-7, 6-8.

* cited by examiner

FIG. 1

| Syntax | No. of bits | Mnemonics |
|---|---|---|
| extended_display_definition_segment ( ) { | | |
| sync_byte | 8 | bslbf |
| segment_type | 8 | bslbf |
| page_id | 16 | uimsbf |
| segment_length | 16 | uimsbf |
| edds_version_number | 4 | uimsbf |
| reserved | 4 | uimsbf |
| display_width | 16 | uimsbf |
| display_height | 16 | uimsbf |
| display_shift_type | 2 | uimsbf |
| reference_disparity | 14 | uimsbf |
| } | | |

FIG. 2

| Syntax | No. of bits | Mnemonics |
|---|---|---|
| extended_page_composition_segment ( ) { | | |
| sync_byte | 8 | bslbf |
| segment_type | 8 | bslbf |
| page_id | 16 | uimsbf |
| segment_length | 16 | uimsbf |
| page_time_out | 8 | uimsbf |
| page_version_number | 4 | uimsbf |
| page_state | 2 | bslbf |
| reserved | 2 | bslbf |
| while (processed_length < segment_length) { | | |
| corresponding_region_id | 8 | uimsbf |
| reserved | 6 | bslbf |
| region_shift_type | 2 | bslbf |
| region_disparity | 16 | uimsbf |
| } | | |
| } | | |

FIG. 3

| display_shift_type | View position | final coordinate |
|---|---|---|
| '00'-Left fixed, Right shift | Left view | region_horizontal_adress |
| | Right view | region_horizontal_adress-reference_disparity |
| '01'-Right fixed, Left shift | Left view | region_horizontal_adress+reference_disparity |
| | Right view | region_horizontal_adress |
| '10'-Left / Right shift | Left view | region_horizontal_adress+(reference_disparity/2) |
| | Right view | region_horizontal_adress-(reference_disparity/2) |

FIG. 4

| display_shift_type | View position | final coordinate |
|---|---|---|
| '00'-Left fixed, Right shift | Left view | region_horizontal_adress |
| | Right view | region_horizontal_adress-reference_disparity |
| '01'-Right fixed, Left shift | Left view | region_horizontal_adress+reference_disparity |
| | Right view | region_horizontal_adress |
| '10'-Left / Right shift | Left view | region_horizontal_adress+(reference_disparity/2) |
| | Right view | region_horizontal_adress-(reference_disparity/2) |
| '11'-Explicit coordinate designation | Base view (without L/R relationship) | region_horizontal_adress |
| | Extended view (without L/R relationship) | region_disparity (In this case, it is analyzed as a coordinate, not disparity) |

FIG. 5

| Syntax | No. of bits | Mnemonics |
|---|---|---|
| object_disparity_segment ( ) { | | |
|     sync_byte | 8 | bslbf |
|     segment_type | 8 | bslbf |
|     page_id | 16 | uimsbf |
|     segment_length | 16 | uimsbf |
|     disparity_version_number | 4 | uimsbf |
|     reserved | 4 | bslbf |
|     while (processed_length < segment_length) { | | |
|         region_id | 8 | uimsbf |
|         object_id | 16 | bslbf |
|         reserved | 7 | bslbf |
|         target_view_position | 1 | bslbf |
|         object_disparity_value | 8 | uimsbf |
|     } | | |
| } | | |

FIG. 6

| Syntax | No. of bits | Mnemonics |
|---|---|---|
| display_definition_segment_EXT ( ) { | | |
| sync_byte | 8 | bslbf |
| segment_type | 8 | bslbf |
| page_id | 16 | uimsbf |
| segment_length | 16 | uimsbf |
| dds_version_number | 4 | uimsbf |
| display_window_flag | 1 | uimsbf |
| reserved | 2 | uimsbf |
| target_view_position | 1 | uimsbf |
| display_width | 16 | uimsbf |
| display_width | 16 | uimsbf |
| minimum_disparity_value | 16 | uimsbf |
| maximum_disparity_value | 16 | uimsbf |
| if (display_window_flag == 1) { | | |
| display_window_horizontal_position_minimum | 16 | uimsbf |
| display_window_horizontal_position_maximum | 16 | uimsbf |
| display_window_vertical_position_minimum | 16 | uimsbf |
| display_window_vertical_position_maximum | 16 | uimsbf |
| } | | |
| } | | |

FIG. 7

| Syntax | No. of bits | Mnemonics |
|---|---|---|
| page_composition_segment_EXT ( ) { | | |
|     sync_byte | 8 | bslbf |
|     segment_type | 8 | bslbf |
|     page_id | 16 | uimsbf |
|     segment_length | 16 | uimsbf |
|     page_time_out | 8 | uimsbf |
|     page_version_number | 4 | uimsbf |
|     page_state | 2 | bslbf |
|     reserved | 2 | bslbf |
|     while (processed_length < segment_length) { | | |
|         region_id | 8 | uimsbf |
|         reserved | 7 | bslbf |
|         target_view_position | 1 | bslbf |
|         region_horizontal_address | 16 | uimsbf |
|         region_vertical_address | 16 | uimsbf |
|         region_disparity_value | 8 | uimsbf |
|     } | | |
| } | | |

FIG. 8

| Syntax | No. of bits | Mnemonics |
|---|---|---|
| Object_Definition_Segment_Extension ( ) { | | |
|     sync_byte | 8 | bslbf |
|     segment_type | 8 | bslbf |
|     page_id | 16 | uimsbf |
|     region_id | 8 | uimsbf |
|     segment_length | 16 | uimsbf |
|     subregion_version_number | 4 | uimsbf |
|     subregion_extent_flag | 1 | bslbf |
|     reserved | 3 | uimsbf |
|     if (subregion_extent_flag==1) | | |
|     { | | |
|       region_disparity_integer_part | 8 | tcimsbf |
|       region_disparity_fractional_part | 4 | uimsbf |
|       reserved | 4 | uimsbf |
|     } | | |
|     else | | |
|     { | | |
|       subregion_id | 8 | uimsbf |
|       subregion_position_flag | 1 | bslbf |
|       region_disparity_flag | 1 | bslbf |
|       reserved | 6 | uimsbf |
|       if (subregion_position_flag==1) | | |
|       { | | |
|         subregion_horizontal_position | 16 | uimsbf |
|         subregion_width | 16 | uimsbf |
|       } | | |
|       subregion_disparity_integer_part | 8 | tcimsbf |
|       subregion_disparity_fractional_part | 4 | uimsbf |
|       reserved | 4 | uimsbf |
|     } | | |
|   } | | |
| } | | |

METHOD AND APPARATUS FOR PROCESSING AND RECEIVING DIGITAL BROADCAST SIGNAL FOR 3-DIMENSIONAL SUBTITLE

Pursuant to 35 U.S.C. §119(e), This application claims the benefit of U.S. Provisional Application No. 61/349,884 filed on May 30, 2010, U.S. Provisional Application No. 61/374,251 filed on Aug. 16, 2010 and U.S. Provisional Application No. 61/413,900 filed on Nov. 15, 2010 which are hereby incorporated by reference as if fully set forth herein.

TECHNICAL FIELD

The present invention relates to a method for transmitting a three-dimensional (3D) image over a network and a broadcast receiver for processing a broadcast signal including a 3D image and, more particularly, to a broadcast signal processing method for providing a 3D effect to a subtitle displayed along with a 3D image and a broadcast receiver for receiving a broadcast signal processed using the broadcast signal processing method.

BACKGROUND ART

Generally, a three dimensional (3D) image (or a stereoscopic image) provides a user's eyes with a stereoscopic effect using the stereoscopic visual principle. A human being feels both near and far through a binocular parallax caused by a distance between their eyes spaced apart from each other by about 65 mm, such that the 3D image enables both right and left eyes to respectively view associated planar images, resulting in the stereoscopic effect and the perspective effect.

The above-mentioned 3D image display method may be classified into a stereoscopic scheme, a volumetric scheme, a holographic scheme, etc. In case of using the stereoscopic scheme, the 3D image display method provides a left view image to be viewed by the left eye and a right view image to be viewed by the right eye, such that the user's left eye views the left view image and the user's right eye views the right view image through either polarization glasses or a display device, resulting in recognition of the 3D image effect.

DISCLOSURE

Technical Problem

An object of the present invention devised to solve the problem lies in efficient transmission of a 3D subtitle displayed along with 3D content of a broadcast signal.

An object of the present invention devised to solve the problem lies in provision of an efficient and convenient broadcast environment to a user by processing and displaying received 3D subtitle data in consideration of a display condition of a 3D video display device and a 3D effect of content set during manufacture in the case where a broadcast receiver receives subtitle data in a 3D broadcast environment.

Technical Solution

To achieve these objects and other advantages and in accordance with the purpose of the invention, as embodied and broadly described herein, a method for processing a digital broadcast signal including a 3-dimensional, 3D, content is suggested. The method comprises encoding 3D video data for the 3D content, the 3D video data including a left picture for a left view and a right picture for a right view for a 3D image, generating signaling data including a subtitle segment having information for signaling 3D subtitles for the 3D content, wherein the subtitle segment includes sub-region disparity information indicating value of disparity applied to at least one sub-region of a region of the 3D image for the 3D subtitles, the disparity being a difference between horizontal positions of a pixel representing a same point in space in the right and left view of the 3D image, and transmitting the digital broadcast signal including the encoded 3D video data and generated signaling data.

In another aspect of the present invention, provided herein is an apparatus for receiving a digital broadcast signal including a 3-dimensional, 3D, content comprising a receiving unit configured to receive the digital broadcast signal including 3D video data for the 3D content and signaling data, a demultiplexer configured to demultiplex the 3D video data and the signaling data from the received digital broadcast signal, the 3D video data including a left picture for a left view and a right picture for a right view for a 3D image, an extracting unit configured to extract a subtitle segment having information for signaling 3D subtitles for the 3D content from the demultiplexed signaling data, wherein the subtitle segment includes sub-region disparity information indicating value of disparity applied to at least one sub-region of a region of the 3D image for the 3D subtitles, the disparity being a difference between horizontal positions of a pixel representing a same point in space in the right and left view of the 3D image, and a control unit configured to control a display of the 3D subtitle for the 3D content based on the extracted subtitle segment.

In another aspect of the present invention, the value of disparity is applied symmetrically to each view of the region or sub-region.

In another aspect of the present invention, the subtitling segment further includes information indicating existence of sub-regions in the region of the 3D image, and wherein the value of disparity indicated by the sub-region disparity information is applied to the region when the information indicates no sub-regions exist in the region.

In another aspect of the present invention, the subtitling segment further includes default disparity information specifying default disparity value which is applied to all regions in the 3D image when a digital broadcast receiver is not capable of applying individual disparity values to each region.

In another aspect of the present invention, the sub-region disparity information includes integer part information specifying integer part of the value of disparity and fractional part information specifying fractional part of the value of disparity.

In another aspect of the present invention, the subtitling segment further includes sub-region horizontal information specifying horizontal position of the at least one sub-region and sub-region width information specifying horizontal width of the at least one sub-region.

In another aspect of the present invention, the subtitling segment further includes shift type information specifying that the value of disparity is applied to which view among the left and right view for the 3D subtitle.

Advantageous Effects

According to the present invention, it is possible to efficiently transmit a 3D subtitle along with 3D content through a broadcast signal.

In addition, according to the present invention, it is possible to efficiently process a 3D subtitle in a broadcast receiver.

Furthermore, according to the present invention, it is possible to process a 3D subtitle according to performance of a broadcast receiver.

In addition, according to embodiments of the present invention, a 3D subtitle data processing method maintains compatibility with a 2D legacy broadcast receiver, and at the same time displays subtitle data having a 3D effect through a broadcast receiver capable of displaying 3D video data.

DESCRIPTION OF DRAWINGS

The accompanying drawings, which are included to provide a further understanding of the invention, illustrate embodiments of the invention and together with the description serve to explain the principle of the invention.

FIG. 1 is a diagram showing the syntax of an extended display definition segment according to an embodiment of the present invention.

FIG. 2 is a diagram showing the syntax of an extended page composition segment according to an embodiment of the present invention.

FIG. 3 is a diagram showing a display position of a subtitle according to the display_shift_type field according to an embodiment of the present invention.

FIG. 4 is a diagram showing a display position of a subtitle of the region_shift_type according to an embodiment of the present invention.

FIG. 5 is a diagram showing the syntax of an extended object disparity segment according to an embodiment of the present invention.

FIG. 6 shows a syntax structure of an extended Display Definition Segment (DDS) acting as extended subtitle display information according to one embodiment of the present invention.

FIG. 7 shows a syntax structure of an extended Page Composition Segment (PCS) acting as extended subtitle display information according to one embodiment of the present invention.

FIG. 8 is a diagram showing the syntax of an extended object definition segment according to another embodiment of the present invention.

BEST MODE

Figure 9:
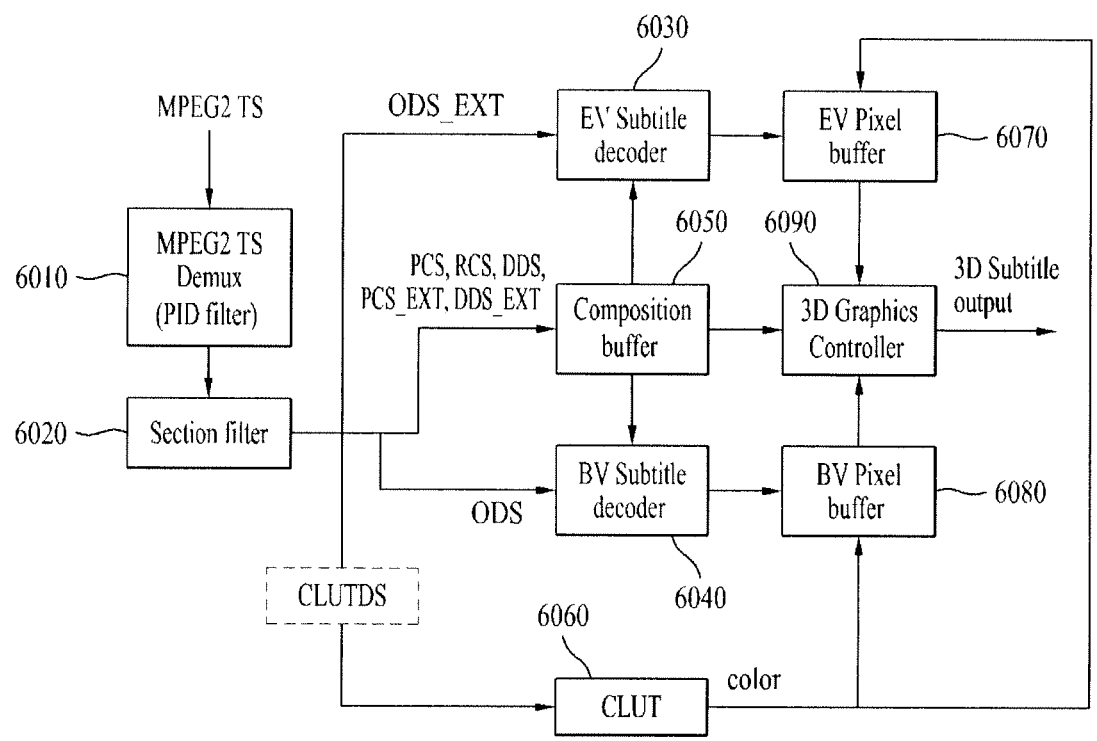
FIG. 9 is a block diagram illustrating a decoding block in a broadcast receiver for receiving and processing 3D subtitle data according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention.

Prior to describing the present invention, it should be noted that most terms disclosed in the present invention are defined in consideration of functions of the present invention and correspond to general terms well known in the art, and can be differently determined according to intention of those skilled in the art, usual practices, or introduction of new technologies. In some cases, a few terms have been selected by the applicant as necessary and will hereinafter be disclosed in the following description of the present invention. Therefore, it is preferable that the teems defined by the applicant be understood on the basis of their meanings in the present invention.

The 3D image display method includes a stereoscopic imaging scheme in which two view points are considered and a multi-view imaging scheme in which three or more view points are considered. In contrast, a single view image scheme shown in the related art may also be referred to as a monoscopic image scheme.

The stereoscopic imaging scheme is designed to use one pair of right and left view images acquired when a left-side camera and a right-side camera spaced apart from each other by a predetermined distance capture the same target object. The multi-view imaging scheme uses three or more images captured by three or more cameras spaced apart by a predetermined distance or angle. Although the following description discloses embodiments of the present invention using the stereoscopic imaging scheme as an example, the inventive concept of the present invention may also be applied to the multi-view imaging scheme.

A stereoscopic image or multi-view image may be compressed and coded according to a variety of methods including a Moving Picture Experts Group (MPEG) scheme, and transmitted to a destination.

For example, a stereoscopic image or a multi-view image may be compressed and coded according to the H.264/Advanced Video Coding (AVC) scheme, and transmitted. In this case, the reception system may decode a received image in reverse order of the H.264/AVC coding scheme, such that it is able to obtain the 3D image.

In addition, one of a left view image and a right view image of a stereoscopic image or one of multiple-view images may be assigned to an image of a base layer, and the remaining one may be assigned to an image of an extended layer. The base layer image may be encoded using the same method as the monoscopic imaging method. In association with the extended layer image, only information of the relationship between the base layer image and the extended layer image may be encoded and transmitted. As an exemplary compression coding scheme for the base layer image, a JPEG, an MPEG-2, an MPEG-4, or a H.264/AVC scheme may be used. For convenience of description, the H.264/AVC scheme may be exemplarily used in one embodiment of the present invention. In one embodiment of the present invention, the compression coding scheme for an image of an upper or higher layer may be set to the H.264/Multi-view Video Coding (MVC) scheme.

When the MVC scheme is additionally applied to the AVC scheme or the right/left image sequences are coded using only the AVC scheme so as to implement the stereoscopic display, one point to be duly considered when broadcasting corresponding 3D content data is compatibility with the 2D broadcast receiver of the related art. For the related broadcast receiver incapable of supporting the 3D image display, if one of right and left view images is encoded and transmitted according to a backward compatible method, the 2D broadcast receiver recognizes and outputs only the corresponding signal, such that it may be possible for a user to view the corresponding content data through the related device. In the following description, a base layer image of a time point where content data is transferred for a legacy broadcast receiver may be referred to as base view video data (or a base video), and an extended layer image transferred for displaying a 3D image may be referred to as extended view video data (or an extended video).

In the case of transferring the base view video data and the extended view video data as described above, a legacy 2D broadcast receiver receives the base video data so that it can display a 2D image, and a 3D broadcast receiver receives base view video data and extended view video data so that it can display a 3D image.

In the case of displaying 3D content, a plurality of subtitles may be displayed on a screen according to the characteristics of the 3D content or the use of a subtitle. In this case, the plurality of subtitles may have the same depth on a broadcast screen or may have different depths in order to efficiently provide a 3D effect.

For example, in the case where a plurality of actors appears and a plurality of actors simultaneously speaks their parts in 3D content, the parts are displayed as a 3D subtitle so as to provide an effect different from that of a 2D environment. That is, the depths of the subtitles representing the parts of the actors may be differently set according to the depths of the actors on one screen.

As another example, while a subtitle such as a broadcast station's logo displayed on an upper right side of a broadcast screen may be displayed at a depth closer to viewers than the depth of 3D content representing a 3D effect, the subtitle associated with the 3D content may be displayed at a depth relatively far apart from the viewers.

The term 'Subtitle' in the following description may include not only a subtitle but also displayed image, text data, graphic image, logo, etc which are additionally displayed to basic video data.

The broadcast system transmits subtitle data as a variety of information of a subtitle. At this time, the subtitle data may include not only subtitle display information including configuration, size, position, etc. needed for displaying a subtitle, but also information of a display color of a subtitle. The subtitle display information includes display definition information associated with a display window structure needed for displaying a subtitle, page composition information, region composition information, object data information, and the like. From the viewpoint of a syntax structure for data transmission, display definition information may be referred to as a display definition segment, page composition information may be referred to as a page composition segment, region composition information may be referred to as a region composition segment, and object data information may be referred to as an object data segment.

A related broadcast signal provides only basic subtitle display information. Accordingly, when a 3D broadcast receiver desires to display the basic subtitle display information, the basic subtitle display information may be represented by a 2D broadcast signal or may not be displayed. Therefore, it is necessary to transmit information capable of allowing even the subtitle display information to be displayed in a 3D format, and a broadcast receiver capable of displaying subtitle data in a 3D format using the above-mentioned information and a data processing method thereof are needed.

In the case of displaying a stereoscopic image, left view video data and right view video data are horizontally shifted by a predetermined distance so as to implement a 3D effect, and then displayed. At this time, a variety of representation values (such as a shifted distance) capable of indicating the 3D effect may be used. In accordance with the embodiment of the present invention, a disparity value will hereinafter be used as such a representation value of the 3D effect.

The 3D effect may be acquired from the process in visual perception leading to the sensation of depth from two slightly different projections of the world onto the retinas of the eyes. The difference in the two retinal images may be called horizontal disparity, retinal disparity, or binocular disparity. Hereinafter, for convenience of description and better understanding of the present invention, the difference between the two retinal images will only be referred to as 'disparity'.

For example, in the case of transmitting 3D video data, respective scenes of the 3D video data may have different 3D effects. In this case, disparity values for corresponding scenes are transmitted to a broadcast receiver, so that the broadcast receiver controls and displays the 3D effect using the disparity values. Although other representation values (for example, a depth value, a pixel interval, a screen size, etc.) instead of the above disparity values may be used to display the 3D effect, it should be noted that the embodiments of the present invention will exemplarily use the disparity value for convenience of description and better understanding of the present invention.

In the case of transmitting subtitle data using the related broadcast transmission scheme, the 3D broadcast receiver receives base view video data and extended view video data and displays the received base view video data and the received extended view video data as 3D video data. However, the subtitle data has no information for a 3D display, such that it has a disadvantage in that it must display 3D video data as a 2D format. In this case, the subtitle can be displayed only as base view video data or an extended view video data, and a user views the subtitle in a 2D format in a different way from a 3D image, so that the user may experience dizziness and feel fatigue of eyes.

Accordingly, it is necessary to transmit both 3D video data and information of a 3D effect to the related subtitle data. In this way, the 3D effect information may be inserted into the related subtitle display information or it is possible to transmit additional subtitle display information.

As a method for transmitting a 3D subtitle through a broadcast system, a method for respectively transmitting a subtitle for a left view and a subtitle for a right view may be used, similarly to a method for transmitting a 3D image. As another method, a method for transmitting one subtitle and a disparity value for a 3D effect together may be used. Since the depth of the subtitle is not frequently changed on a broadcast content screen unlike an image and a change in depth within one subtitle is unusual, the method for transmitting the subtitle using the disparity value is advantageous in view of transmission efficiency.

In order to transmit information associated with disparity over a network, a method for transmitting information associated with extended disparity of a subtitle segment for providing display information associated with the existing subtitle may be used. Such a method disables a legacy receiver to receive/process the extended subtitle segment and enables the existing subtitle segment using the conventional method, thereby maintaining compatibility with the conventional broadcast system even in the case of providing a 3D subtitle.

The extended subtitle segment may be provided in the extension form of a display definition segment, a page composition segment, a region composition segment or an object data segment. This extension form may be referred to as an extended display definition segment, an extended page composition segment, an extended region composition segment or an extended object data segment. As another example, a segment for providing information associated with disparity may be defined to be included in the subtitle segment. That is, information added in association with disparity may be combined into one segment so as to be defined in the extended display definition segment, the extended page composition segment, the extended region composition segment or the extended object data segment.

Such a subtitle segment may be processed by a transmission unit similarly to the processing of the subtitle segment in the conventional broadcast system and may be transmitted to a broadcast receiver through a broadcast signal.

FIG. 1 is a diagram showing the syntax of an extended display definition segment according to an embodiment of the present invention.

The extended display definition segment (EDDS) according to the embodiment of the present invention includes information defining graphic plane associated information added for rendering a subtitle in a 3DTV. The EDDS may provide information to prevent a phenomenon wherein an object of a 3D video and a graphic plane overlap thus hindering a stereoscopic effect when a subtitling service for a stereoscopic video broadcast is provided.

The EDDS may include display definition information corresponding to an extended view. At this time, in one embodiment of the present invention, a page_id value is set to be equal to a page_id value of a DDS corresponding to a base view. A segment_type field may have a value for identifying the EDDS.

Fields included in the EDDS will now be described.

Sync_byte is an 8-bit field that shall be coded with the value '0000 1111'. Inside a PES packet, decoders can use the sync_byte to verify synchronization when parsing segments based on the segment_length, so as to determine transport packet loss.

The segment_type field indicates the type of data contained in the segment data field. For example, the segment_type field identifies whether a segment including this field is a display definition segment, a page composition segment, a region composition segment, an object data segment, an extended display definition segment, an extended page composition segment, an extended region composition segment, an extended object data segment or a separately defined disparity associated segment.

The page_id identifies the subtitle service of the data contained in this subtitling_segment. Segments with a page_id value signaled in the subtitling descriptor as the composition page_id, carry subtitling data specific for one subtitle service. Accordingly, segments with the page_id signaled in the subtitling descriptor as the ancillary page id, carry data that may be shared by multiple subtitle services.

The segment_length shall specify the number of bytes contained in the immediately following payload of segment The edds_version_number field indicates the version of the extended DDS.

The display_width field indicates the maximum horizontal width in pixels of a display assumed by a subtitling stream associated with the extended DDS.

The display_height field indicates the maximum vertical height in lines of the display in lines of a display assumed by the subtitling stream associated with the extended DDS.

The display_shift_type field specifies a method for outputting a graphic/subtitle for a left view and a graphic/subtitle for a right view. More particularly, this field provides information indicating based on which of the left view and the right view a disparity value of a subtitle is applied. In this case, disparity may be applied to any one of the left view and the right view or disparity information may be symmetrically applied to the left view and the right view.

Although the meaning of the value of the display_shift_type field according to one embodiment of the present invention is defined in the following description, the definition of each value is not limited and the meaning of each value may be changed.

If the value of the display_shift_type field is set to "00", the position of the graphic/subtitle for the left view in a process of blending the left and right view graphic planes for a 3D subtitle output is not changed. That is, information associated with a subtitle transmitted through a display definition segment (DDS), a page composition segment (PCS), etc. is used as information associated with a subtitle of the left view. At this time, the right view may be shifted from the position of the graphic/subtitle for the base view (e.g., left view) by a value designated in the reference_disparity so as to be output.

If the value of the display_shift_type field is set to "01", the right view graphic plane uses a conventional 2D coordinate or an originally intended coordinate and a subtitle to be output on the left view graphic plane is shifted to the right by the reference_disparity. In this case, the right view may become a base view and the left view may become an extended view such that the reference_disparity value is applied to the left view.

If the value of the display_shift_type field is set to "10", a subtitle to be output on the left view graphic plane is shifted to the right by (reference_disparity/2) and a subtitle to be output on the right view graphic plane is shifted to the left by (reference_disparity/2) so as to be output.

More specifically, to ensure that subtitles are placed at the correct depth and horizontal location the disparity shift values signalled shall be applied symmetrically to each view and by implication any object bounded in the each view. A positive disparity shift value x shall result in a shift of x pixels to the left in the left subtitle image and a shift of x pixels to the right in the right subtitle image. A negative disparity shift value x shall result in a shift of x pixels to the right in the left subtitle image and a shift of x pixels to the left in the right subtitle image.

The reference_disparity field indicates an absolute value of disparity between subtitles included in the left and right images. That is, since the disparity value may have a positive value or a negative value, only the absolute value of the disparity is signaled in this field.

The broadcast receiver may infer a range which does not overlap a stereoscopic image signal of a 3DTV when outputting an OSD, graphic or subtitle at certain coordinates using this value. That is, the OSD, graphic or subtitle is preferably positioned at a position closer to a user than the stereoscopic image signal of the 3DTV.

In one embodiment of the present invention, if all stereoscopic image signals of the 3DTV are formed behind the screen (display) (positive disparity only), the reference_disparity may be set to 0.

FIG. 2 is a diagram showing the syntax of an extended page composition segment according to an embodiment of the present invention.

Referring to FIG. 2, the page composition segment (PCS) includes information of constituent components of a displayed subtitle. The PCS may include usage- and positioning-information of at least one region constructing the displayed page. In accordance with one embodiment of the present invention, the extended PCS (EPCS) shown in FIG. 2 is transmitted, such that the receiver can control an output of a subtitle at an extended view.

The sync_byte field, the segment_type field, the page_id field and the segment_length field are similar to the above-described fields of the EDDS.

The page_time_out specifies the period, expressed in seconds, after which a page instance is no longer valid and consequently shall be erased from the screen, should it not have been redefined before that. The time-out period starts when the page instance is first displayed. The page_time_out value applies to each page instance until its value is redefined. The purpose of the time-out period is to avoid a page instance remaining on the screen "for ever" if the Integrated Receiver Decoder (IRD) happens to have missed the redefinition or deletion of the page instance. The time-out period does not need to be counted very accurately by the IRD: a reaction accuracy of −0/+5 s is accurate enough.

The page_version_number indicates version of this page composition segment. When any of the contents of this page composition segment change, this version number is incremented.

The page_state signals the status of the subtitling page instance described in this page composition segment.

The processed_length is the number of bytes from the field(s) within the while-loop that have been processed by the decoder.

The corresponding_region_id field identifies a region to which the EPCS is applied. The corresponding_region_id field may designate the id of a corresponding region among the regions defined in the PCS.

A plurality of regions may be present on one page and a subtitle displayed in each region may be present. At this time, the corresponding_region_id field defines with which region a specific subtitle is associated.

The region_shift_type field differently defines the method of outputting the graphic/subtitle for the left view and the graphic/subtitle for the right view in region units. That is, the region_shift_type field serves to provide information regarding the above-described display_shift_type in region units.

Hereinafter, definition according to the value of the region_shift_type field will be described. As described above, such definition is not limited to a specific value of the region_shift_type field.

If the value of the region_shift_type field is set to "00", the position of the graphic/subtitle for the left view in a process of blending the left and right view graphic planes for a 3D subtitle output is not changed. That is, information received in the PCS, etc. may be used for the left view without change. At this time, the subtitle of the right view may be shifted from the position of the graphic/subtitle for the base view (e.g., left view) by a value designated in the region_disparity field so as to be output.

If the value of the region_shift_type field is set to "01", the right view graphic plane uses a 2D coordinate or an originally intended coordinate and a subtitle to be output on the left view graphic plane is shifted by the value of the region_disparity field so as to be output. That is, the subtitle for the left view is shifted based on the right view.

If the value of the region_shift_type field is set to "10", a subtitle to be output on the left view graphic plane is shifted to the right by (region_disparity/2) and a subtitle to be output on the right view graphic plane is shifted to the left by (region_disparity/2) so as to be output. In this case, the application of the region_disparity value is similar to the above description of the display_shift_type field.

If the value of the region_shift_type field is set to "11", a coordinate to be output to the base view is fixed to a region_horizontal_address regardless of the left/right and a coordinate to be output to the extended view is fixed to a region-disparity value.

The region_disparity field means a difference between the horizontal coordinates of the base view and the extended view with respect to the corresponding region_id (corresponding_region_id). That is, the region-disparity field indicates an absolute value of disparity between the left and right images to be applied to the corresponding region.

FIG. 3 is a diagram showing a display position of a subtitle according to the display_shift_type field according to an embodiment of the present invention.

A receiver must output graphic planes corresponding to two views configuring a stereoscopic video, that is, a base view and an extended view, in order to output a 3D subtitle.

The receiver identifies basic information of the graphic plane to which an OSD, graphic, subtitle, etc. is output using the DDS. The receiver also identifies the depth information of the graphic plane using the EDDS.

Since a reference disparity value is signaled through the EDDS, all different subtitle regions in a screen have the same disparity (depth). In this case, a reference disparity value may be used as a default disparity value which may be used by a receiver which cannot apply different disparities according to regions or sub-regions. Alternatively, disparity values slightly different from the reference disparity value may be set using an algorithm of the receiver.

The receiver according to the embodiment of the present invention receives a DDS and identifies size information of the graphic plane and offset information in the entire screen. At this time, if the DDS is not present, the graphic plane of the SD resolution (720×576) is analyzed in one embodiment of the present invention.

The receiver receives a PCS and identifies information regarding a page and position information of each region included in the page.

The receiver may acquire information regarding an object configuring a region, information regarding an actual bit-map object and color information necessary to render subtitle graphic data using a Region Composition Segment (RCS), an Object Definition Segment (ODS) and a Color Look-up Table (CLUT).

The receiver identifies a reference disparity value using the EDDS, for a 3D subtitle.

Each subtitle region is output to the graphic plane corresponding to the base view and the extended view. At this time, the disparity applied to the subtitle is shown in FIG. 3. That is, a determination as to whether the base view and the extended view are respectively the left view and the right view, a determination as to which graphic plane (left or right) the reference disparity is applied according to the disparity_shift_type field or a determination as to at which coordinate a subtitle is positioned is made. The shift (offset) degree of the coordinate uses the reference_disparity field of the EDDS.

The subtitles which are output to the left and right graphic planes and are displayed in regions with a 3D effect in correspondence with each other are the same and an offset therebetween is present in the output coordinates of the images.

As shown in FIG. 3, if the value of the display_shift_type field is set to "00", the subtitle of the left view may be positioned based on the region_horizontal_address and the subtitle of the right view may be positioned based on the value considering the reference_disparity value in the region_horizontal_address.

If the value of the display_shift_type is set to "01", the subtitle of the right view may be positioned based on the region_horizontal_address and the subtitle of the left view may be positioned based on the value considering the reference_disparity value in the region_horizontal_address.

If the value of the display_shift_type is set to "10", the left view and the right view may be positioned based on the value considering ½ of the reference_disparity value in the region_horizontal_address. Alternatively, the reference_disparity value may be used as the shift value of the left view and the right view in the region_horizontal_address.

According to one embodiment of the present invention, even when an OSD screen such an EPG, graphic or menu is output in a 3DTV, the reference disparity received through the EDD may be used. At this time, as shown in FIG. 3, the coordinates of data output on the left and right graphic planes may be controlled and, if an OSD screen exceeds the range of a full screen, adequate cropping and scaling may be necessary.

The receiver may prepare EPG, graphic, icon and menu data to be output on the screen and determine a final offset (shift) value using the reference_disparity just before output. If the OSD screen exceeds the range of the full screen, a region protruding from the screen occurs by reference disparity. This region may be simply cropped and output.

If an important or meaningful portion is excluded during cropping, scaling must be performed before cropping. That is, if an offset value is D when graphic data having a horizontal size of 1920 is output, a region corresponding to D is lost in an output process. At this time, in one embodiment of the present invention, a method of applying a scaling factor of (1920)/(1920+D) to an entire graphic screen and outputting left and right graphic data may be used. If scaling is performed, cropping is not necessary, but, if cropping is necessary, cropping may also be performed.

FIG. 4 is a diagram showing a display position of a subtitle of the region_shift type according to an embodiment of the present invention.

The case where the value of the region_shift_type is set to "00", "01" or "10" is similar to the case where the value of the display_shift_type is set to "00", "01" or "10", a description thereof will be omitted.

If the value of the region_shift_type is "11", the left view and the right view are not distinguished and the subtitle of the base view is positioned based on the region_horizontal_address and the subtitle of the extended view is positioned using the region_disparity value. At this time, the region_disparity value may not be defined as the offset value but may be defined as the coordinates where the subtitle of the extended view will be positioned.

As described above, if an EPCS is used to signal the disparity value of a subtitle, since the coordinates of the extended view may be designated for each region, each subtitle region may have an independent disparity (depth).

A process of displaying a 3D subtitle using an EPCS will now be described.

The coordinates of the subtitle region are determined through the same process as a 2D subtitle and the disparity values of the left and right graphic planes of each region are identified using the region_disparity_value of the EPCS.

Each subtitle region is output on the graphic plane corresponding to the base view or the extended view. At this time, the final coordinates of the subtitle included in each base view or extended view are determined using the method shown in FIG. 4. That is, a determination as to whether the base view and the extended view are respectively the left view and the right view, a determination as to on which graphic plane (left or right) a base subtitle and a subtitle with an offset are output according to the disparity_shift_type, or at which coordinates the subtitle is positioned is made. The shift (offset) degree of the coordinates may use the region_disparity_value of the corresponding region.

The EDDS may not be present. In this case, a reference disparity which may be used when an OSD screen such as EPG, graphic or menu is output is not present. In this case, the receiver may select a maximum absolute value among the region_disparity values of the region which is currently displayed and may randomly use the maximum absolute value as the reference disparity value.

A procedure of processing a 3D subtitle in a receiver according to an embodiment of the present invention will now be described.

The receiver receives a broadcast stream. The broadcast stream includes service information. The receiver parses a Program Map Table (PMT) in the service information.

The receiver parses the subtitling_descriptor within the parsed PMT and determines whether a 3D subtitle of specific 3D content is present using the subtitling_type field of the subtitling_descriptor. At this time, if it is determined that the 3D subtitle of the specific 3D content is present, information indicating that the 3D subtitle of the specific 3D content is present may be displayed on the screen through OSD, etc. such that a viewer selects the 3D subtitle.

The receiver identifies a packet for transmitting a segment including subtitle-associated information included in the broadcast stream. For example, if a PES packet having a data_identifier field value of 0x20 and a subtitle_stream_id value of 0x00 is identified and the segment associated with signaling of the subtitle in the packet is parsed.

At this time, the receiver may determine the type of the segment using the value of the segment_type field.

For example, the segment is a page composition segment for the base view if the value of the segment_type field is 0x10, is a region composition segment for the base view if the value of the segment_type field is 0x11, is a CLUT definition segment for both the base view and the extended view if the value of the segment_type field is 0x12, is an object data segment for the base view if the value of the segment_type field is 0x13, is a display definition segment for the base view if the value of the segment_type field is 0x14, is a page composition segment for the extended view if the value of the segment_type field is 0x40, is a region composition segment for the extended view if the value of the segment_type field is 0x41, is an object data segment for the extended view if the value of the segment_type field is 0x43, and is a display definition segment for the extended view if the value of the segment_type field is 0x44.

The receiver may acquire display information of the subtitle for the base view using the DDS and/or PCS. In addition, the receiver may decode pixel-data_sub-block data included in the object data segment (ODS) and acquire a pseudo-color value of a logo or a subtitle to be output on the base view graphic plane. In addition, the pseudo-color may be converted into color information to be actually output on the display using the CLUT definition segment. That is, the color information of the subtitle to be output on the base view graphic plane may be acquired.

Next, the receiver identifies display information such as the size, the position, the object configuration information of the subtitle for the extended view using the EDDS and/or EPCS. At this time, the coordinates of the subtitle positioned in the base view and the extended view may be corrected by the display_shift_type or the region_shift_type. In this process, in the embodiment of the present invention, when the coordinates of the subtitle are determined at each region level, information regarding the EPCS may be set to be prior to information regarding the EDDS. That is, when a conflict occurs in the disparity_shift_type or disparity value, the information regarding the EPCS may override the information regarding the EDDS.

FIG. 5 is a diagram showing the syntax of an extended object disparity segment according to an embodiment of the present invention.

According to one embodiment of the present invention, disparity information may be differently applied according to regions included in a 3D image or according to sub-regions or objects in a region. Additional information may be included in an extended object disparity segment (EODS) or in a newly defined segment for providing information associated with disparity.

The ODS may include data of a plurality of displayed objects. In one embodiment of the present invention, an EODS shown in FIG. 5 is transmitted, so that a receiver can control an output of a subtitle at an extended view.

The sync_byte field, the segment_type field, the page_id field and the segment_length field are similar to the above-described EDDS.

The disparity_version_number field identifies version/update information of the EODS.

The region_id field identifies a region in a page and the object_id field identifies an object included in a region.

The target_view_position field may indicate based on which view a 3D subtitle to which disparity is applied is implemented using information regarding the object disparity segment. For example, in the case where a horizontal address calculated using the conventional 2D subtitle scheme is N, the base view and the extended view respectively become N and N+ object_disparity_value, if the value of this field is "0". In contrast, if the value of this field is "1", the horizontal addresses of the objects of the base view and the extended view respectively have N− object_disparity_value and N.

The object_disparity_value field means a disparity value between an object applied to the target_view_position and an object applied to another view position and this value indicates the horizontal displacement of the corresponding subtitle object between the left and right views.

The disparity determined by the target_view_position field and the object_view_position field may be applied to the object identified by the region_id field and the object_id field.

A process of applying disparity to each object and displaying a 3D subtitle in a receiver will now be described. The following process is only exemplary and may be partially changed or omitted. Alternatively, some steps may be added to the following process.

The receiver receives a broadcast stream. The broadcast stream includes service information. The receiver parses a Program Map Table (PMT) contained in the service information.

The receiver parses a subtitling_descriptor within the PMT and determines whether a 3D subtitle of specific 3D content is present using a subtitling_type field of the subtitling_descriptor. If it is determined that the 3D subtitle of the specific 3D content is present, information indicating that the 3D subtitle of the specific 3D content is present may be displayed on the screen through OSD, etc. such that a viewer selects the display of the 3D subtitle.

The receiver identifies a packet for transmitting a segment including subtitle-associated information included in the broadcast stream. For example, a PES packet having a data_identifier field value of 0x20 and a subtitle_stream_id value of 0x00 is identified and a segment associated with signaling of the subtitle in the packet is parsed.

At this time, the receiver may determine the type of the segment using a segment_type field value.

For example, the receiver may determine that the segment is a page composition segment for the base view if the value of the segment_type field is 0x10, that the segment is a region definition segment for the base view if the value of the segment_type field is 0x11, that the segment is a CLUT definition segment for the extended view if the value of the segment_type field is 0x12, that the segment is an object data segment for the base view if the value of the segment_type field is 0x13, that the segment is a display definition segment for the base view if the value of the segment_type field is 0x14, and that the segment is an object data segment for the extended view if the value of the segment_type field is 0x43.

The receiver identifies a region and object to which the 3D subtitle is applied, using a region_id field and an object_id field included in the EODS.

The receiver may acquire display information of the subtitle for the base view using the DDS and/or PCS. The receiver may decode pixel-data_sub-block included in the object data segment (ODS) and acquire a pseudo-color value of a logo or subtitle to be output on the base view graphic plane. In addition, the pseudo-color may be converted into color information to be actually output on the display using the CLUT definition segment. That is, the color information of the subtitle to be output on the base view graphic plane may be acquired.

Next, position information indicating where the already decoded object will be output on the extended view graphic plane is identified using the object_disparity_value included in the EODS. The receiver determines the coordinates of the 3D subtitle in each view plane using the target_view_position information and performs 3D formatting of two graphic planes, thereby outputting a 3D graphic/subtitle/logo.

FIG. 6 shows a syntax structure of an extended Display Definition Segment (DDS) acting as extended subtitle display information according to one embodiment of the present invention.

The DDS includes display width information and display height information of a TV image in which a DVB subtitle is rendered. In other words, the DDS indicates a display size of a video image including a subtitle stream to be displayed. In one embodiment of the present invention, an extended DDS (DDS_EXT) shown in FIG. 6 is transmitted, so that a receiver can control an output of a subtitle at an extended view.

Individual fields of the extended DDS shown in FIG. 6 are as follows.

A 'dds_version_number' field may indicate a version of the extended DDS.

A 'display_window_flag' field may indicate whether a subtitle display set associated with the extended DDS is intended to be rendered in a window within the display size defined by 'display_width' and 'display_height' fields or to be rendered directly within the display size defined by 'display_width' and 'display_height' fields.

A 'display_width' field may indicate a maximum horizontal width in pixels of a display assumed by a subtitling stream associated with the extended DDS.

A 'display_height' field may indicate a maximum vertical height in lines of a display in lines of a display assumed by a subtitling stream associated with the extended DDS.

A 'display_window_horizontal_position_minimum' field may indicate a left-hand most pixel of a subtitle display set with reference to a left-hand most pixel of a display.

A 'display_window_horizontal_position_maximum' field may indicate a right-hand most pixel of a subtitle display set with reference to a left-hand most pixel of a display.

A 'display_window_vertical_position_minimum' field may indicate an upper most line of a subtitle display set with reference to a top line of a display.

A 'display_window_vertical_position_maximum' field may indicate a bottom line of a subtitle display set with reference to a top line of a display.

The above-mentioned fields may be pre-contained in the DDS, and then be transmitted. In this case, information of the same or duplicated fields having been transmitted in the DDS is omitted and as such only the following information may be transmitted.

A 'page_id' field may indicate an identifier (ID) of a page on which a subtitle is displayed. In case of a 'page_id' value, the subtitle will be displayed on the same page at a base view and an extended view, so that the 'page_id' value may be identical to a 'page_id' value of a DDS corresponding to the base view, and then be transmitted.

A 'segment_type' field may have a value different from a related DDS value (e.g., 0x14), and must have a specific value (e.g., 0x44) capable of identifying an extended DDS.

A 'target_view_position' field may indicate a view position to which the extended DDS is applied. In other words, the 'target_view_position' field indicates viewpoint information for displaying a stereoscopic subtitle. For example, if the subtitle display of a corresponding extended DDS is applied to a left image, the 'target_view_position' field may be set to a value of '0'. If the subtitle display of a corresponding extended DDS is applied to a right image, the 'target_view_position' field may be set to a value of '1'.

A 'minimum_disparity_value' field may indicate a minimum value of a disparity capable of being represented by a left image and a right image. The lower the disparity value of the 'minimum_disparity_value' field (i.e., the closer the disparity value of the 'minimum_disparity_value' field is to a negative value), the image forming position gradually moves to the front of the screen.

A 'maximum_disparity_value' field may indicate a maximum value of a disparity value capable of being represented by a left image and a right image. The higher the disparity value of the 'maximum_disparity_value' field (i.e., the closer the disparity value of the 'maximum_disparity_value' field is to a positive value), the image forming position gradually moves to the interior of the screen.

The extended DDS may define the range of a disparity value capable of being allocated when a subtitle is displayed through the 'minimum_disparity_value' field 1040 and the 'maximum_disparity_value' field.

As described above, in association with the DDS, the extended DDS includes not only viewpoint allocation information for individual subtitles, but also 3D effect information (i.e., disparity values), such that a receiver can display a subtitle having the 3D effect.

FIG. 7 shows a syntax structure of an extended Page Composition Segment (PCS) acting as extended subtitle display information according to one embodiment of the present invention.

Referring to FIG. 7, the PCS includes information of constituent components of a displayed subtitle. The PCS may include usage- and positioning-information of at least one region constructing the displayed page. In accordance with one embodiment of the present invention, the extended PCS (PCS_EXT) shown in FIG. 7 is transmitted, such that the receiver can control an output of a subtitle at an extended view.

Individual fields of the extended PCS shown in FIG. 7 are as follows.

A 'page_id' field may indicate an identifier (ID) of a page on which a subtitle is displayed. In case of a 'page_id' value, the subtitle will be displayed on the same page at a base view and an extended view, so that the 'page_id' value may be identical to a 'page_id' value of a DDS corresponding to the base view, and then be transmitted.

A 'page_time_out' field may indicate a period, expressed in seconds, after which a page instance is no longer valid and consequently shall be erased from the screen, should it not have been redefined before that.

A 'page_version_number' field may indicate a version of the extended PCS.

A 'page_state' field may indicate a status of a subtitling page instance described in the extended PCS.

A 'region_id' field may indicate a unique identification of a region within a page. The 'region_id' field may display a subtitle in the same region at the base view and the extended view, such that it is identical to a 'region_id' value of a PCS corresponding to the base view and then transmitted.

A 'region_horizontal_address' field indicates a horizontal address of a top left pixel of this region. The left-most pixel of the active pixels has a horizontal address of zero, and the pixel address increases from left to right.

A 'region_vertical_address' field may indicate a vertical address of a top line of this region. The top line of the frame is a line of zero, and the line address increases by one within the frame from top to bottom.

A 'target_view_position' field may indicate a view position at which the extended PCS is applied. That is, the 'target_view_position' field may indicate viewpoint information for displaying a stereoscopic subtitle. For example, if a subtitle display of a corresponding extended PCS is applied to a left image, the 'target_view_position' field may be set to a value of '0'. If a subtitle display of a corresponding extended PCS is applied to a right image, the 'target_view_position' field may be set to a value of '1'.

A 'region_disparity_value' field may indicate a disparity between a first region applied to the left image and a second region applied to the right image. The 'region_disparity_value' field may indicate a horizontal displacement of other view on the basis of a target view. In the case of transmitting a value of 'region_disparity_value' field, a 'region_horizontal_address' field and a 'region_vertical_address' field may be redundant, so that the redundant fields may be omitted as necessary.

For example, it is assumed that the 'target_view_positon' field of the extended PCS has a value of 1, the 'region_disparity_value' field has a value of 20, and the 'region_horizontal_address' field has a value of N. In this case, a subtitle for the extended PCS is displayed as a right image, and a subtitle for the PCS is displayed as a left image. In this case, the horizontal position of the subtitle displayed on the left image is 'N', the horizontal position of the subtitle displayed on the right image is 'N−20', so that a binocular parallax is generated in response to a difference in horizontal positions between the left image and the right image, resulting in the occurrence of a 3D effect.

Configuration of subtitle display information for displaying a stereoscopic subtitle in accordance with one embodiment of the present invention and a method for processing the subtitle display information will hereinafter be described.

The configuration and process of a Display Definition Segment (DDS) and a Page Composition Segment (PCS) for displaying a stereoscopic subtitle according to one embodiment of the present invention will hereinafter be described.

In order to allow a receiver to display a stereoscopic subtitle, the receiver must receive subtitle information of two views, i.e., one subtitle information for a base view and the other subtitle information for an extended view. A transmission system can transmit a DDS and a PCS for the base view and the extended DDS and the extended PCS for the extended view.

In this case, in the case where a value incapable of being recognized by a related 2D broadcast receiver is established in a segment type of each of the extended DDS and the extended PCS, and is then transmitted, the related 2D broadcast receiver discards the extended DDS and the extended PCS, and controls a subtitle display using the DDS and the PCS. The 3D broadcast receiver controls a subtitle display for the base view using the DDS and the PCS, and controls a subtitle display for the extended view using the extended DDS and the extended PCS, so that it can display a subtitle having the 3D effect.

Next, the configuration and process of a Region Composition Segment (RCS) for displaying a stereoscopic display according to another embodiment of the present invention will hereinafter be described.

The RCS may include information about a list of displayed objects and information about positions of the objects in the region. In the case of transmitting the extended PCS, a segment type value incapable of being analyzed by the related 2D broadcast receiver may be established in the extended RCS corresponding to a region identifier (ID) contained in the extended PCS so as to prevent operations of the related 2D broadcast receiver from being affected, and the established segment type value is then transmitted. In the case of transmitting the extended RCS in accordance with one embodiment of the present invention, the segment type value may be set to '0x41'. In this case, the extended RCS may have the same structure as in the related RCS.

In addition, region composition information for the extended view may be transmitted using the RCS (i.e., segment type=0x11) instead of using the extended RCS. In this case, the region ID of this RCS is unavailable in the received PCS, so that the related 2D broadcast receiver can discard the above RCS.

The configuration and process of an Object Data Segment (ODS) for displaying a stereoscopic subtitle according to another embodiment of the present invention will hereinafter be described in detail.

The RCS or the extended RCS includes object information for constructing the region, and detailed information of a corresponding object may be contained in the ODS and then be transmitted. In this case, in order to prevent operations of the related 2D broadcast receiver from being affected, the extended ODS for describing a subtitle object for the extended view may be transmitted. The extended ODS has the same structure as in the related ODS, and may be assigned another segment type value (e.g., 0x43) different from that of the related ODS and then be transmitted.

In addition, object information for the extended view may be transmitted using the related ODS instead of using the extended ODS. In this case, the object ID of the received ODS is unavailable, so that the related 2D broadcast receiver can discard the above ODS.

In accordance with one embodiment of the present invention, a variety of combinations may be constructed according to configurations of the above-mentioned 'DDS_EXT', 'PCS_EXT' 'RCS_EXT' (or 'RCS'), and 'ODS_EXT' (or 'ODS') and methods for transmitting these segments. That is, the 'DDS_EXT', 'PCS_EXT', 'RCS_EXT', and 'ODS_EXT' are not constructed to have the same 3D effect, and are constructed to have different 3D effects. For example, different disparity values may be assigned to the 'DDS_EXT', 'PCS_EXT', 'RCS_EXT', and 'ODS_EXT'. As a result, a variety of 3D subtitle combinations which have different 3D effects according to pages, regions, and objects of individual subtitles can be displayed.

According to another embodiment of the present invention, the broadcast receiver receives a DVB broadcast stream, and extracts subtitle data from the received broadcast stream. In more detail, the broadcast receiver parses a Program Map Table (PMT) from the DVB broadcast stream, obtains a PID value of a stream having a stream type (stream type=0x06), and receives a Packet Elementary Stream (PES) corresponding to a DVB subtitle. In this case, the broadcast receiver can obtain basic information of a subtitle from the PMT. In accordance with one embodiment of the present invention, the broadcast receiver determines whether current data is a 3D subtitle by referring to a 'subtitling type' field of a ' subtitling_descriptor' field contained in the PMT, so that it can inform a user of information about the availability or non-availability of a 3D subtitle. The broadcast receiver reads a PES packet, which has a value '0x20' of a 'data_identifier' field and a value '0x00' of a 'subtitle_stream_id' value, so that it can extract subtitle data using the read PES packet.

The broadcast receiver performs section-filtering of the extracted subtitle data. The broadcast receiver performs filtering of detailed information contained in subtitle data, and outputs the filtered information to a corresponding buffer. In this case, the subtitle data may be classified as follows according to values of the 'segment type' field.

0x10—Page Composition Segment (PCS) for Base View

0x11—Region Composition Segment (RCS) for Base View

0x12—CLUT definition segment for both Base View and Extended View

0x13—Object Data Segment (ODS) for Base View

0x14—Display Definition Segment (DDS) for Base View

0x40—extended Page Composition Segment (PCS_EXT) for Extended View

0x41—extended Region Composition Segment (RCS_EXT) for Extended View

0x43—extended Object Data Segment (ODS_EXT) for Extended View

0x44—extended Display Definition Segment (DDS_EXT) for Extended View

The broadcast receiver decodes subtitle display information for a base view from the classified DDS, PCS, RCS, and ODS. The broadcast receiver decodes the DDS, the PCS, the RCS, and the DDS, so that it can obtain size information of a subtitle to be displayed, position information of the subtitle, object configuration information, object's unique information, and the like. Information needed for the broadcast receiver to display a subtitle at a base view may also be called subtitle control information.

The broadcast receiver decodes the ODS, and parses a Color Look Up Table (CLUT), so that it determines subtitle display color information at a base view. The broadcast receiver decodes 'pixel-data_sub-block' data contained in the ODS, so that it can acquire a pseudo-color value of a subtitle to be displayed on a base view graphic plane. The broadcast receiver parses the CLUT, so that it can convert the pseudo-color value into information of a color to be actually displayed.

The broadcast receiver decodes extended subtitle display information for the extended view from the extended DDS, the extended PCS, the extended RCS (or RCS), and the extended ODS (or ODS). The broadcast receiver decodes the extended DDS, the extended PCS, the extended RCS, and the extended ODS (or ODS), so that it can recognize size information of a subtitle to be displayed, position information of the subtitle, object configuration information, object's unique information, and the like. Information needed for the broadcast receiver to display a subtitle at the extended view may also be referred to as extended subtitle control information as necessary.

The broadcast receiver decodes the extended ODS (or an ODS), and parses a CLUT, so that it determines subtitle display color information at a extended view. The broadcast receiver decodes 'pixel-data_sub-block' data contained in the extended ODS (or an ODS), so that it can acquire a pseudo-color value of a subtitle to be displayed on the extended view graphic plane. The broadcast receiver parses the CLUT, so that it can convert the pseudo-color value into information of a color to be actually displayed.

In a 3D display, a color of a left view subtitle may be equal to a color of a right view subtitle. In this case, the broadcast receiver may determine only once the color information of a subtitle to be displayed, and may use subtitle color information of other viewpoint by reading the determined color information.

The broadcast receiver controls a subtitle for the base view and a subtitle for the extended view according to individual subtitle control information, and outputs the controlled subtitles. The broadcast receiver outputs the base view subtitle along with base view video data according to subtitle control information and outputs the extended view subtitle along with extended view video data according to extended subtitle control information, so that it can display a 3D subtitle.

In the above-mentioned steps, the step for processing subtitle display information for a base view subtitle and the other step for processing extended subtitle display information of an extended view subtitle need not always be carried out in the above order. If necessary, subtitle display information for the extended view may be first carried out, or subtitle display information for the base view and subtitle display information for the extended view may be simultaneously carried out.

FIG. 8 is a diagram showing the syntax of an extended object definition segment according to another embodiment of the present invention.

Since viewers may use various types of receivers but a broadcast signal is transmitted using the same format, it is impossible to respectively transmit various types of broadcast signals to the receivers. Therefore, options for various receivers must be included in the same broadcast signal.

According to the embodiment of the present invention, disparity may be differently applied to a 3D subtitle according to a plurality of regions belonging to one page or according to sub-regions or objects belonging to each region.

However, some receivers may not apply disparity to the 3D subtitle according to regions, sub-regions or objects. There is a need for a method of receiving information associated with a 3D subtitle and processing the information without error even at such receivers.

According to the present invention, a default disparity value for such receivers may be transmitted along with disparity information of each sub-region. Such receivers may equally apply the default disparity value to the entire region.

The description of each field included in the extended object definition segment according to another embodiment of the present invention will now be described. The sync_byte field, the segment_type field, the page_id field, the region_id field and the segment_length field are similar to the same fields included in the above-described segment and a description thereof will be omitted.

The subregion_version_number field indicates version information.

The subregion_extent_flag field indicates whether a sub-region is present in a region. That is, the subregion_extent_flag field provides information indicating whether the region is divided into sub-regions. In one embodiment of the present invention, if the value of the subregion_extend_flag is "1", it is indicated that the region is not divided into sub-regions. That is, the region includes only one sub-region.

The region_disparity_integer_part field indicates an integer part of the disparity value of a specific region.

The region_disparity_fractional_part field indicates a fractional part of the disparity value of the specific region.

According to the embodiment of the present invention, if the subregion_extent_flag is "1", since the region does not include a plurality of sub-regions (that is, the region includes only one sub-region), the disparity value to be applied to the region is signaled. Accordingly, the transmitter transmits the disparity value of the region using the region_disparity_integer_part field and the region_disparity_fractional_part field.

The subregion_id field identifies a sub-region. The sub-region may be defined as a low-level region belonging to the region. A plurality of sub-regions may be present in the region. If only one sub-region is present in the region, the region has the same meaning as the sub-region.

The subregion_position_flag field indicates whether position information of the sub-region is provided.

The region_disparity_flag field indicates whether the following fields, that is, the value of the subregion_disparity_integer_part and/or the value of the subregion_disparity_fractional_part field, are used as the disparity value of the entire region. For example, if the region_disparity_flag field is set to "1", the disparity value of the following sub-region may be recognized as the default disparity value of the page and/or the region. In this case, the region_disparity_flag field for other sub-regions is set to "0" and the disparity value of the sub-region is not recognized as the default disparity value.

The subregion_horizontal_position field specifies the left-hand most pixel position of this subregion. This value shall always fall within the declared extent of the region of which this is a subregion.

The subregion_width field specifies the horizontal width of this subregion expressed in pixels. The combination of subregion_horizontal_position and subregion_width shall always fall within the declared extent of the region to which this refers.

The subregion_disparity_integer_part field indicates an integer part of the disparity value applied to the sub-region.

The subregion_disparity_fractional_part field indicates a fractional part of the disparity value applied to the sub-region.

The receiver may be largely divided into two types, one is a receiver ("A type") in which one disparity value may be applied to one region and/or page and the other is a receiver ("B type") in which the disparity value may be differently applied according to the sub-regions and/or the objects in the region.

If the subregion_extent_flag is "1", since the region is not divided into sub-regions, the A-type and B-type receiver can process the subtitle segment.

If the subregion_extent_flag is "0", since the sub-region is present in the region, the B-type receiver may apply the disparity value according to the sub-regions using the above-described fields. Since the A-type receiver may not apply the disparity value according to a plurality of sub-regions, the default disparity value is applied to the entire region. For example, if the value of the region_disparity_flag is "1", the values of the following fields, that is, the value of the subregion_disparity_integer_part and/or the value of the subregion_disparity_fractional_part field, are used as the default disparity value of the entire region.

A procedure of processing a 3D subtitle at a receiver based on the above description will now be described.

The receiver receives a broadcast stream. The broadcast stream includes service information. The receiver parses a Program Map Table (PMT) in the service information.

The receiver parses a subtitling_descriptor within the parsed PMT and determines whether a 3D subtitle of specific 3D content is present using a subtitling_type field of the subtitling_descriptor. If it is determined that the 3D subtitle of the specific 3D content is present, information indicating that the 3D subtitle of the specific 3D content is present may be displayed on the screen through OSD, etc. such that a viewer selects the display of the 3D subtitle.

The receiver identifies a packet for transmitting a segment including subtitle-associated information included in the broadcast stream. For example, a PES packet having a data_identifier field value of 0x20 and a subtitle_stream_id value of 0x00 is identified and a segment associated with signaling of the subtitle in the packet is parsed.

At this time, the receiver may determine the type of the segment using a segment_type field value.

For example, the receiver may determine that the segment is a page composition segment for the base view if the value of the segment_type field is 0x10, that the segment is a region definition segment for the base view if the value of the segment_type field is 0x11, that the segment is a CLUT definition segment for the extended view if the value of the segment_type field is 0x12, that the segment is an object data segment for the base view if the value of the segment_type field is 0x13, that the segment is a display definition segment for the base view if the value of the segment_type field is 0x14, and that the segment is an object data segment for the extended view if the value of the segment_type field is 0x43.

The receiver identifies information regarding a region in which the subtitle is displayed using the region_id field and the subregion_id field included in the extended object data segment (EODS, ODS_EXT). In this case, the region in which the subtitle is displayed may be determined based upon position and width information of each subregion-id.

The receiver identifies the size, position and object configuration information of the subtitle for the base view using the DDS, PCS and the region composition segment (RCS), in order to decode the subtitle of the region.

The receiver may decode pixel-data_sub-block data included in the object data segment (ODS) and acquire a pseudo-color value of a logo or subtitle to be output on the base view graphic plane. In addition, the pseudo-color may be converted into color information to be actually output on the display using the CLUT definition segment. That is, the color information of the subtitle to be output on the base view graphic plane may be acquired.

The receiver calculates the region corresponding to each sub-region of the already decoded region in the extended view graphic plane using the disparity of each sub-region included in the ODS_EXT.

Additionally, the receiver corrects the coordinates of each view plane of the 3D subtitle data using the disparity of each sub-region and performs 3D formatting of two graphic planes, thereby outputting a 3D graphic/subtitle/logo in the stereoscopic display.

If it is difficult to apply the display in sub-region units, the sub-region having the region_disparity_flag value of "1" is selected from among the sub-regions and the disparity of the selected sub-region is applied to the entire region.

FIG. 9 is a block diagram illustrating a decoding block in a broadcast receiver for receiving and processing 3D subtitle data according to one embodiment of the present invention.

Referring to FIG. 9, the broadcast receiver includes a demultiplexer (denoted by 'MPEG2 TS Demux (PID filter)') 6010, a section filter 6020, an Extended View (EV) subtitle decoder 6030, a Base View (BV) subtitle decoder 6040, a composition buffer 6050, a CLUT processor (denoted by 'CLUT') 6060, an EV pixel buffer 6070, a BV pixel buffer 6080, and a 3D graphics controller 6090.

In the broadcast receiver, a receiving unit (not shown) receives a Moving Picture Expert Group 2 Transport Stream (MPEG2 TS) including subtitle data, and the demultiplexer 6010 performs filtering of the received MPEG2 TS using a PID corresponding to subtitle data so that it extracts and outputs subtitle data.

The section filter 6020 performs section-filtering of subtitle data, so that it outputs PCS, PCS_EXT, RCS, RCS_EXT, DDS, DDS_EXT, ODS, ODS_EXT, and Color Look Up Table Definition Segment (CLUTDS) data.

In the following description, the demultiplexer 600 for extracting subtitle data from the received broadcast signal and the section filter 6020 for extracting and outputting display information and CLUTDS of a subtitle may be contained in one extraction unit as necessary.

In this case, PCS, RCS, DDS, ODS, PCS_EXT, RCS_EXT, DDS_EXT, and ODS_EXT may be buffered in the composition buffer 6050, and the buffered results may be applied to the 3D graphics controller 6090. In addition, PCS, RCS, DDS, and ODS may be applied to the BV subtitle decoder 6040, and PCS_EXT, RCS_EXT, DDS_EXT, and ODS_EXT may be applied to the EV subtitle decoder 6030.

The CLUT processor 6060 processes the CLUTDS, so that it outputs display color information to the BV pixel buffer 6080 and the EV pixel buffer 6070.

The BV subtitle decoder 6040 decodes PCS, RCS, DDS, and ODS, so that it decodes subtitle data for the base view and subtitle display information for the base view and outputs the decoded subtitle data and the decoded subtitle display information to the BV pixel buffer 6080. The EV subtitle decoder 6030 decodes PCS_EXT, RCS_EXT, DDS_EXT, and ODS_EXT, so that it decodes subtitle data for the extended view and subtitle display information for the extended view and outputs the decoded subtitle data and the decoded subtitle display information to the EV pixel buffer 6070.

The 3D graphic controller 6090 receives PCS, RCS, DDS, ODS, PCS_EXT, RCS_EXT, DDS_EXT, and ODS_EXT from the composition buffer 6050, and receives subtitle display information for the base view, ODS and color information for the base view from the BV pixel buffer 6080. The 3D graphics controller 6090 receives subtitle display information for the extended view, ODS_EXT and color information for the extended view from the EV pixel buffer 6070. The 3D graphics controller 6090 reads the received information, so that it controls subtitles of respective viewpoints and outputs the controlled subtitles.

In accordance with another embodiment of the present invention, the BV subtitle decoder 6040 decodes the ODS and the EV subtitle decoder 6030 decode the ODS_EXT, so that the BV subtitle decoder 6040 and the EV subtitle decoder 6030 acquire information of a displayed subtitle object. The 3D graphics controller 6090 receives coordinates-, size-, and configuration-information (for example, PCS, RCS, DDS, PCS_EXT, RCS_EXT, and DDS_EXT) of a displayed subtitle object, so that it may control the 3D subtitle display using the received information.

Figure 10:
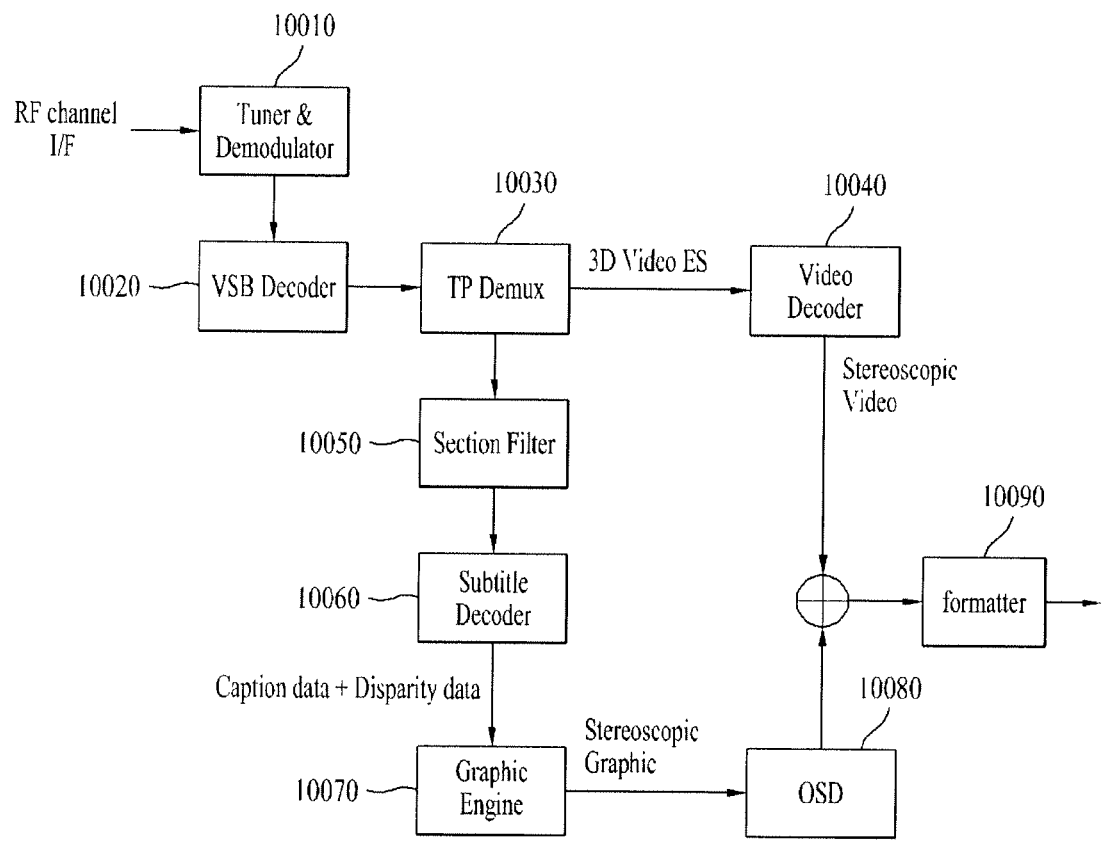
FIG. 10 is a block diagram showing a receiver for receiving a digital broadcast signal according to an embodiment of the present invention.

FIG. 10 is a block diagram showing a receiver for receiving a digital broadcast signal according to an embodiment of the present invention.

The receiver according to the embodiment of the present invention includes a tuner & demodulator 10010, a VSB decoder 10020, a transport stream demultiplexer (DEMUX) 10030, a video decoder 10040, a section filter 10050, a subtitle decoder 10060, a graphic engine 10070, an ODS processor 10080 and a formatter 10090.

The tuner & demodulator 10010 tunes to a channel for transmitting a broadcast signal and demodulates a signal.

The VSB decoder 10020 decodes a signal modulated using a VSB scheme. The VSB decoder may decode a signal modulated using a scheme other than the VSB scheme according to a broadcast system.

The transport stream DEMUX 10030 demultiplexes transport stream data. For example, the transport stream DEMUX 10030 may separate a signaling signal and a video/audio signal.

The video decoder 10040 decodes the video data demultiplexed from the transport stream data. In the present invention, a 3D video elementary stream is delivered to the video decoder 10040. The video decoder 10040 decodes the 3D video elementary stream into 3D video data.

The section filter 10050 serves to filter signaling data for a 3D subtitle. That is, the section filter 10050 filters data such as DDS, EDDS (DDS_EXT), PCS, EPCS (PCS_EXT), RCS, ERCS (RCS_EXT), ODS, EODS (ODS_EXT), CLUTDS (Colour Look Up Table Definition Segment), etc.

The subtitle decoder 10060 decodes signaling information for displaying a 3D subtitle. For example, the subtitle decoder 10060 decodes disparity information for the 3D subtitle. The section filter 10050 and the subtitle decoder 10060 may be collectively referred to as an extracting unit.

The graphic engine 10070 generates a graphic element associated with a subtitle using the signaling information decoded by the subtitle decoder 10060. The subtitle passing through the graphic engine 10070 is output in 3D form. In addition, the graphic engine 10070 performs a series of control functions for displaying the 3D subtitle.

The OSD processor 10080 performs a series of functions associated with the OSD processing of the receiver. For example, the OSD processor 10080 may generate left view and right view OSDs to which the disparity value is applied, for applying a 3D effect to the OSD. In addition, the OSD processor 10080 performs a series of control functions for 3D OSD.

The formatter 10090 serves to format a combination of the 3D video data decoded by the video decoder 10040 and the 3D subtitle and/or the OSD processed by the graphic engine 10070 and/or the OSD processor 10080. The formatted image includes a 3D video image, a 3D subtitle and/or a 3D OSD. In addition, the formatter 10090 performs a series of control functions for displaying a 3D image.

Figure 11:
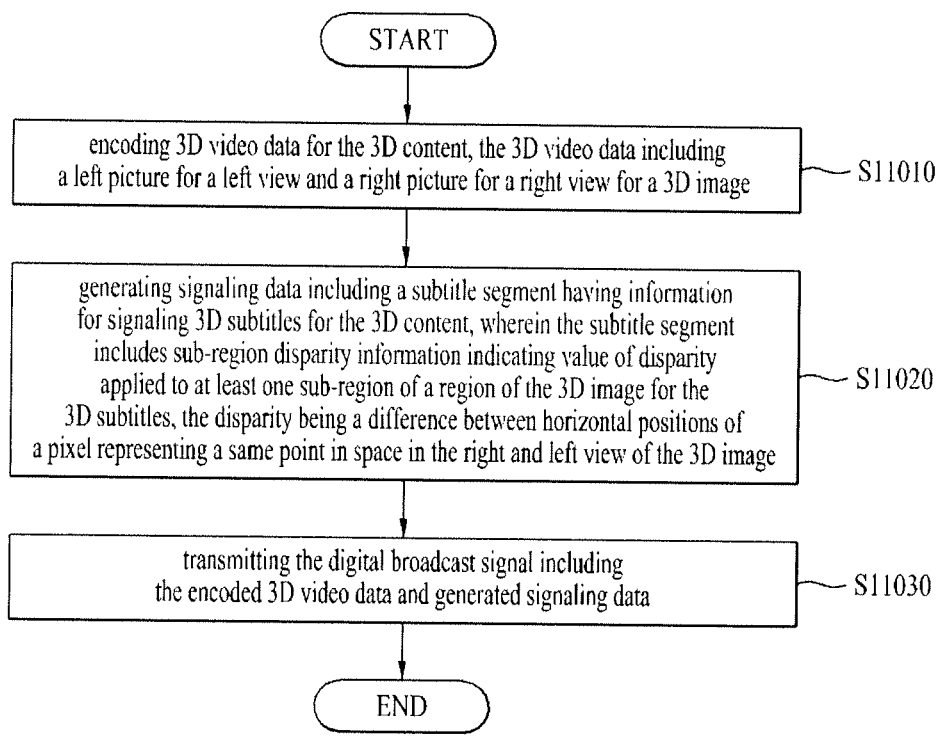
FIG. 11 is a flowchart illustrating a method of processing a 3D subtitle to be transmitted according to an embodiment of the present invention.

FIG. 11 is a flowchart illustrating a method of processing a 3D subtitle to be transmitted according to an embodiment of the present invention.

A transmitter for transmitting a broadcast signal encodes 3D video data for 3D content (s11010). The 3D video data includes a left view image and a right view image for the 3D image.

The transmitter generates signaling data including a subtitle segment for signaling a 3D subtitle to be displayed along with 3D content (s11020). The subtitle segment includes information indicating a disparity value applied to at least one sub-region included in a region. The disparity is a difference between horizontal positions of a pixel representing the same point in space in the right and left view of the 3D image.

The transmitter transmits a broadcast signal including the encoded 3D video data and the generated signaling data (s11030).

Although the present invention has been described in conjunction with the limited embodiments and drawings, the present invention is not limited thereto. Those skilled in the art will appreciate that various modifications, additions and substitutions are possible from this description. Therefore, the scope of the present invention should not be limited to the description of the exemplary embodiments and should be determined by the appended claims and their equivalents.

MODE FOR INVENTION

Various embodiments have been described in the best mode for carrying out the invention.

INDUSTRIAL APPLICABILITY

As described above, the present invention is partially or wholly applied to a digital broadcast system.

The invention claimed is:

1. A method for processing a digital broadcast signal including a 3-dimensional, 3D, content, the method comprising:
  encoding 3D video data for the 3D content, the 3D video data including a left picture for a left view and a right picture for a right view for a 3D image;
  generating signaling data including a subtitle segment having information for signaling 3D subtitles for the 3D content,
  wherein the subtitle segment includes region identification information identifying multiple regions for the 3D subtitles, and sub-region disparity information indicating values of disparities applied to each of sub-regions included in each of the multiple regions of the 3D image for the 3D subtitles when each region is divided into the sub-regions, wherein when there are two or more 3D subtitles in a sub-region a value of the values of the disparities is applied simultaneously to all 3D subtitles included in the sub-region, wherein the disparity is a difference between horizontal positions of a pixel representing a same point in space in the right and left view of the 3D image,
  wherein the region is an area for displaying the 3D subtitles on a 3D display and the sub-region is a certain area included in the region,
  wherein the signaling data further includes region horizontal address information indicating a horizontal address of a top left pixel of the region and region vertical address information indicating a vertical address of a top line of the region, and
  wherein the subtitle segment further includes sub-region horizontal information specifying horizontal position of each of the sub-regions in the region, and sub-region width information specifying horizontal width of each of the sub-regions in the region; and
  transmitting the digital broadcast signal including the encoded 3D video data and generated signaling data,
  wherein the subtitle segment further includes sub-region extent information indicating whether the region includes more than one sub-region or not.

2. The method of claim 1, wherein the value of disparity is applied symmetrically to each view of the region or sub-region.

3. The method of claim 1, wherein the subtitling segment further includes information indicating existence of sub-regions in the region of the 3D image, and wherein the value of disparity indicated by the sub-region disparity information is applied to the region when the information indicates no sub-regions exist in the region.

4. The method of claim 1, wherein the subtitling segment further includes default disparity information specifying default disparity value which is applied to all regions in the 3D image when a digital broadcast receiver is not capable of applying individual disparity values to each region.

5. The method of claim 1, wherein the sub-region disparity information includes integer part information specifying integer part of the value of disparity and fractional part information specifying fractional part of the value of disparity.

6. The method of claim 1, wherein the subtitling segment further includes shift type information specifying that the value of disparity is applied to which view among the left and right view for the 3D subtitle.

7. An apparatus for receiving a digital broadcast signal including a 3-dimensional, 3D, content, the apparatus comprising:
- a receiving unit configured to receive the digital broadcast signal including 3D video data for the 3D content and signaling data;
- a demultiplexer configured to demultiplex the 3D video data and the signaling data from the received digital broadcast signal, the 3D video data including a left picture for a left view and a right picture for a right view for a 3D image;
- an extracting unit configured to extract a subtitle segment having information for signaling 3D subtitles for the 3D content from the demultiplexed signaling data,
- wherein the subtitle segment includes region identification information identifying multiple regions for the 3D subtitles, and sub-region disparity information indicating values of disparities applied to each of sub-regions included in each of the multiple regions of the 3D image for the 3D subtitles when each region is divided into the sub-regions, wherein when there are two or more 3D subtitles in a sub-region a value of the values of the disparities is applied simultaneously to all 3D subtitles included in the sub-region, wherein the disparity is a difference between horizontal positions of a pixel representing a same point in space in the right and left view of the 3D image,
- wherein the region is an area for displaying the 3D subtitles on a 3D display and the sub-region is a certain area included in the region,
- wherein the signaling data further includes region horizontal address information indicating a horizontal address of a top left pixel of the region and region vertical address information indicating a vertical address of a top line of the region, and
- wherein the subtitle segment further includes sub-region horizontal information specifying horizontal position of each of the sub-regions in the region, and sub-region width information specifying horizontal width of each of the sub-regions in the region; and
- a control unit configured to control a display of the 3D subtitle for the 3D content based on the extracted subtitle segment,
- wherein the subtitle segment further includes sub-region extent information indicating whether the region includes more than one sub-region or not.

8. The apparatus of claim 7, wherein the value of disparity is applied symmetrically to each view of the region or sub-region.

9. The apparatus of claim 7, wherein the subtitling segment further includes information indicating existence of sub-regions in the region of the 3D image, and wherein the value of disparity indicated by the sub-region disparity information is applied to the region when the information indicates no sub-regions exist in the region.

10. The apparatus of claim 7, wherein the subtitling segment further includes default disparity information specifying default disparity value which is applied to all regions in the 3D image when a digital broadcast receiver is not capable of applying individual disparity values to each region.

11. The apparatus of claim 7, wherein the sub-region disparity information includes integer part information specifying integer part of the value of disparity and fractional part information specifying fractional part of the value of disparity.

12. The apparatus of claim 7, wherein the subtitling segment further includes shift type information specifying that the value of disparity is applied to which view among the left and right view for the 3D subtitle.

13. The method of claim 1, wherein the subtitle segment further includes sub-region identification information identifying a sub-region included in the region identified by the region identification information.

14. The apparatus of claim 7, wherein the subtitle segment further includes sub-region identification information identifying a sub-region included in the region identified by the region identification information.

* * * * *